(12) United States Patent
Simonson et al.

(10) Patent No.: US 8,103,116 B1
(45) Date of Patent: Jan. 24, 2012

(54) ESTIMATING PIXEL VARIANCES IN THE SCENES OF STARING SENSORS

(75) Inventors: Katherine M. Simonson, Cedar Crest, NM (US); Tian J. Ma, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 564 days.

(21) Appl. No.: 12/396,109

(22) Filed: Mar. 2, 2009

(51) Int. Cl.
 *G06K 9/40* (2006.01)
(52) U.S. Cl. .................................. 382/255; 382/236
(58) Field of Classification Search .................... 382/255
 See application file for complete search history.

(56) References Cited

U.S. PATENT DOCUMENTS

| | | | | |
|---|---|---|---|---|
| 5,149,972 A | * | 9/1992 | Fay et al. | 250/461.1 |
| 5,886,744 A | * | 3/1999 | Hannah | 375/240.16 |
| 7,881,553 B2 | * | 2/2011 | Ishii | 382/270 |
| 2003/0063814 A1 | * | 4/2003 | Herley | 382/255 |
| 2007/0031056 A1 | * | 2/2007 | Perz | 382/255 |

OTHER PUBLICATIONS

Piotrowski, Cynthia C. et al., "An Analysis of the Advantages and Disadvantages of Scene Registration as Part of Space-Time Processing", SPIE Proceedings, 1996, pp. 98-110, vol. 2759.

Kirk, J. Anthony et al., "Principal Component Background Suppression", Proceedings IEEE Aerospace Applications Conference, 1996, pp. 105-119, vol. 3.

Radke, Richard J. et al., "Image Change Detection Algorithms: A Systematic Survey", IEEE Transactions on Image Processing, Mar. 2005, pp. 294-307, vol. 14, No. 3.

Jodoin, Pierre-Marc, et al., "Statistical Background Subtraction using Spatial Cues", IEEE Transactions on Circuits and Systems for Video Technology, Dec. 2007, p. 1758-1763, vol. 17, No. 12.

Jodoin, Pierre-Marc, et al., "Motion Detection With an Unstable Camera", Image Processing, ICIP 2008, p. 229-232.

Jodoin, Pierre-Marc et al., Background Subtraction Framework Based on Local Spatial Distributions, Lecture Notes in Computer Science, 2006, p. 370-380, vol. 4141 LNCS.

Johnson, Norman L. et al., "Continuous Univariate Distributions, vol. 1", 1994, Second Edition, John Wiley & Sons, New York.

* cited by examiner

*Primary Examiner* — Sath V Perungavoor
(74) *Attorney, Agent, or Firm* — Blakely Sokoloff Taylor & Zafman

(57) ABSTRACT

A technique for detecting changes in a scene perceived by a staring sensor is disclosed. The technique includes acquiring a reference image frame and a current image frame of a scene with the staring sensor. A raw difference frame is generated based upon differences between the reference image frame and the current image frame. Pixel error estimates are generated for each pixel in the raw difference frame based at least in part upon spatial error estimates related to spatial intensity gradients in the scene. The pixel error estimates are used to mitigate effects of camera jitter in the scene between the current image frame and the reference image frame.

22 Claims, 9 Drawing Sheets

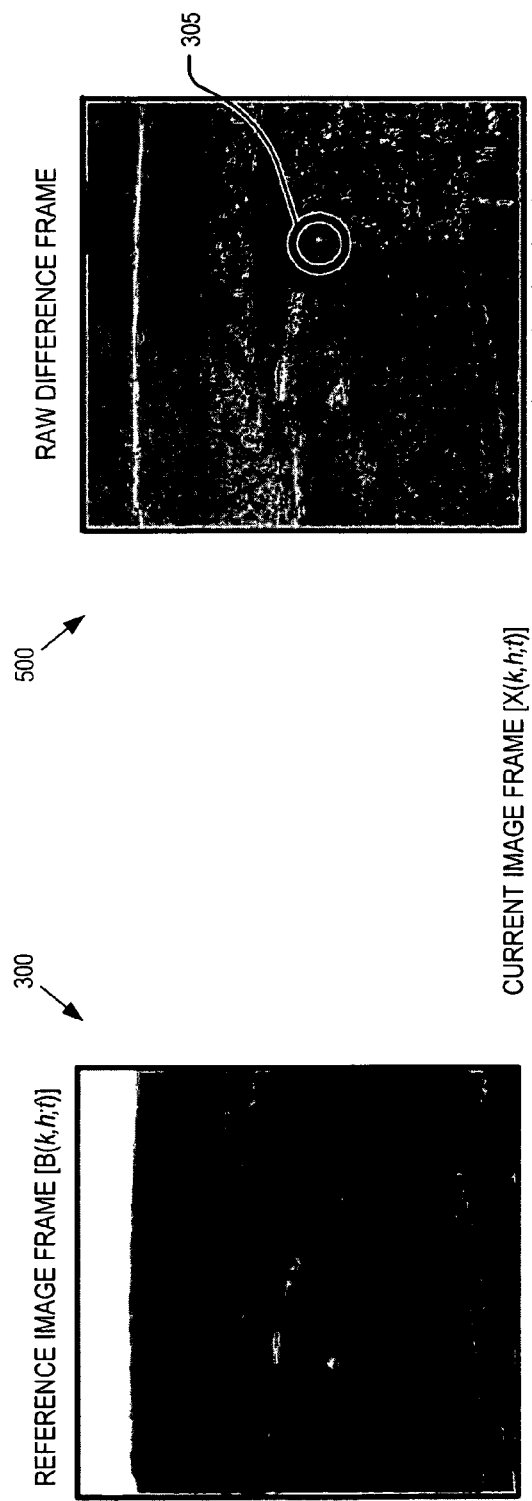
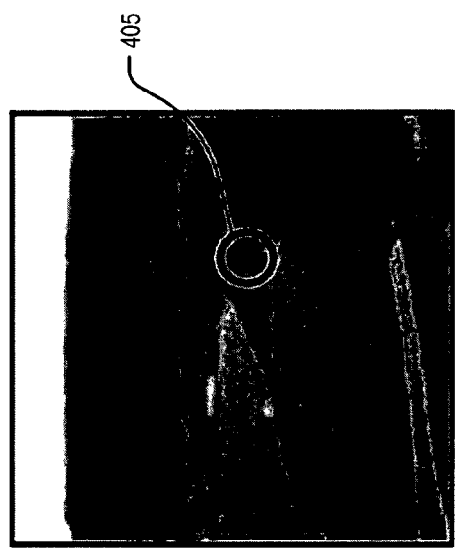
FIG. 5
FIG. 4
FIG. 3

ESTIMATING PIXEL VARIANCES IN THE SCENES OF STARING SENSORS

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to mitigating camera jitter, and in particular but not exclusively, mitigating camera jitter of staring sensors and the automated detection of small changes in the scenes of staring sensors.

BACKGROUND INFORMATION

FIGS. 1A and 1B illustrate two image frames from a low-resolution digital camera at Mammoth Hot Springs, in Yellowstone National Park, taken 67 seconds apart. Even with a careful inspection of image frames 1 and 2, it is difficult to detect any changes between the two images. Automated processing has been used with remote staring sensors (e.g., webcams, security cameras, surveillance cameras, radiometric cameras, traffic cameras, etc.) to detect subtle differences between frames. The automated techniques have traditionally relied on some form of background suppression to detect transient events (changes) observed by staring sensors: to detect events initiating at time t, one begins with the image frame corresponding to t and subtracts an estimate of the "background" signal existing prior to this time. This background estimate may be a single prior frame, a reference image containing no moving objects, or a composite computed from a recent history of frames. For example, the image frames 1 and 2 in FIGS. 1A and 1B, respectively, show the same scene. To detect change, one might subtract one from the other (e.g., FRAME 2-FRAME 1) and generate a difference frame. This difference frame is intended to eliminate the static background and highlight dynamic components in the frames. If the frame and background estimate are not spatially registered to one another prior to subtraction, much of the signal in the difference frame is due to scene gradients, rather than actual changes in the scene (see FIG. 1C). When image frame 2 and background frame 1 are properly registered (to a small fraction of a pixel) prior to subtraction, true changes in the scene stand out more clearly (see FIG. 1D). Unfortunately, sub-pixel registration is often not computationally feasible at sensor frame rates, and is not robust to pixel defects.

Detecting "true" motion in a scene is a key problem in many security and surveillance applications. For applications using staring sensors (e.g., fixed cameras), resulting in a static background scene, background suppression approaches like frame subtraction are commonly used to detect object motion or other scene changes. An intensity difference can be computed between two successive frames, between a frame and a reference image containing no moving objects, or between a frame and a composite background estimate computed from a recent history of sensor frames. The computed intensity difference is then thresholded to detect a motion event within the staring sensor's field of vision.

Significant problems arise whenever the statistical properties of the background signal change abruptly, typically due to sensor or platform jitter. Pixels located in regions of high scene gradient can change substantially with increased jitter, leading to myriad "clutter" false detections whenever the jitter level exceeds that observed in the training data for estimating the background. A false detection is the wrongful determination that detected change within a staring sensor's field of vision is not due to background jitter or noise. For many staring sensors, scene-induced "clutter" is the single largest source of false alarms, limiting both run-time performance and detection sensitivity.

Outdoor applications pose additional challenges, for the background scene itself may not be stationary due to natural events such as foliage moving in the wind, animated water, precipitation, or other phenomena. In these applications, conventional techniques have used filters to predict intensity values in the presence of dynamic backgrounds. Such predictors have the advantage of being able to learn repetitive patterns and thus detect moving objects. However, even these adaptive techniques often fail in the presence of camera jitter.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 is a reference image frame acquired from a staring sensor, in accordance with an embodiment of the invention.

FIG. 4 is a current image frame acquired from a staring sensor, in accordance with an embodiment of the invention.

FIG. 5 is a raw difference frame generated using frame subtraction between the current image frame and the reference image frame, in accordance with an embodiment of the invention.

DETAILED DESCRIPTION

Embodiments of a technique for mitigating camera jitter in staring sensors and automatic detection of small changes of relevance in scenes of staring sensors are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
FIG. 1A (prior art) is a first image frame taken from a staring sensor.
Figure 1B:
FIG. 1B (prior art) is a second image frame taken from the same staring sensor.
Figure 1C:
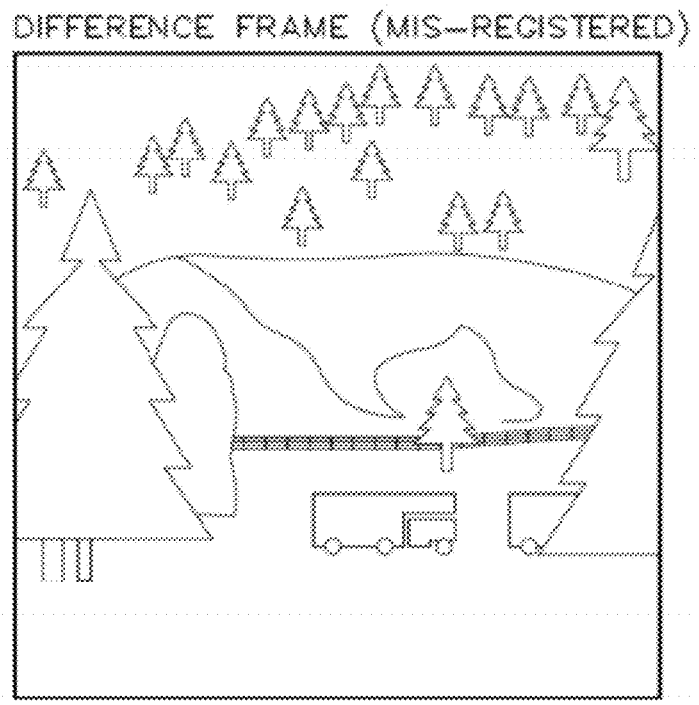
FIG. 1C (prior art) is a mis-registered difference frame.
Figure 1D:
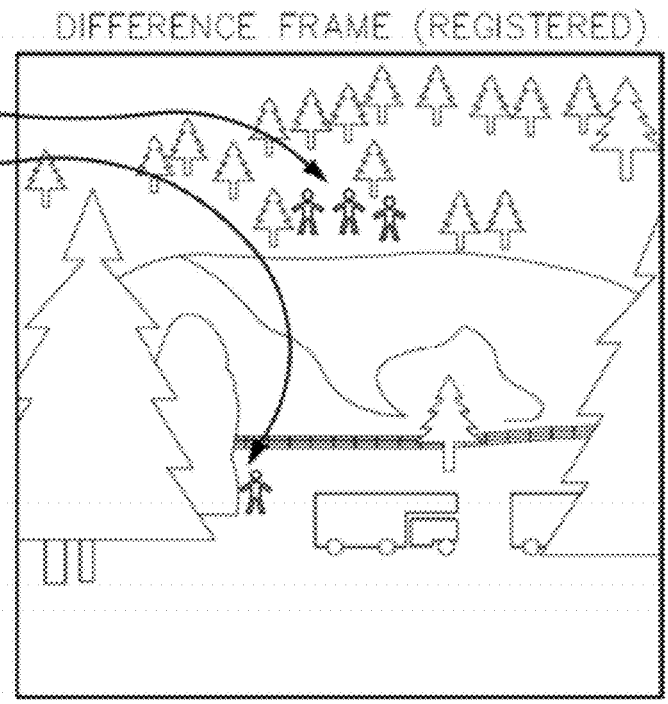
FIG. 1D (prior art) is a properly registered difference frame.
Figure 2:
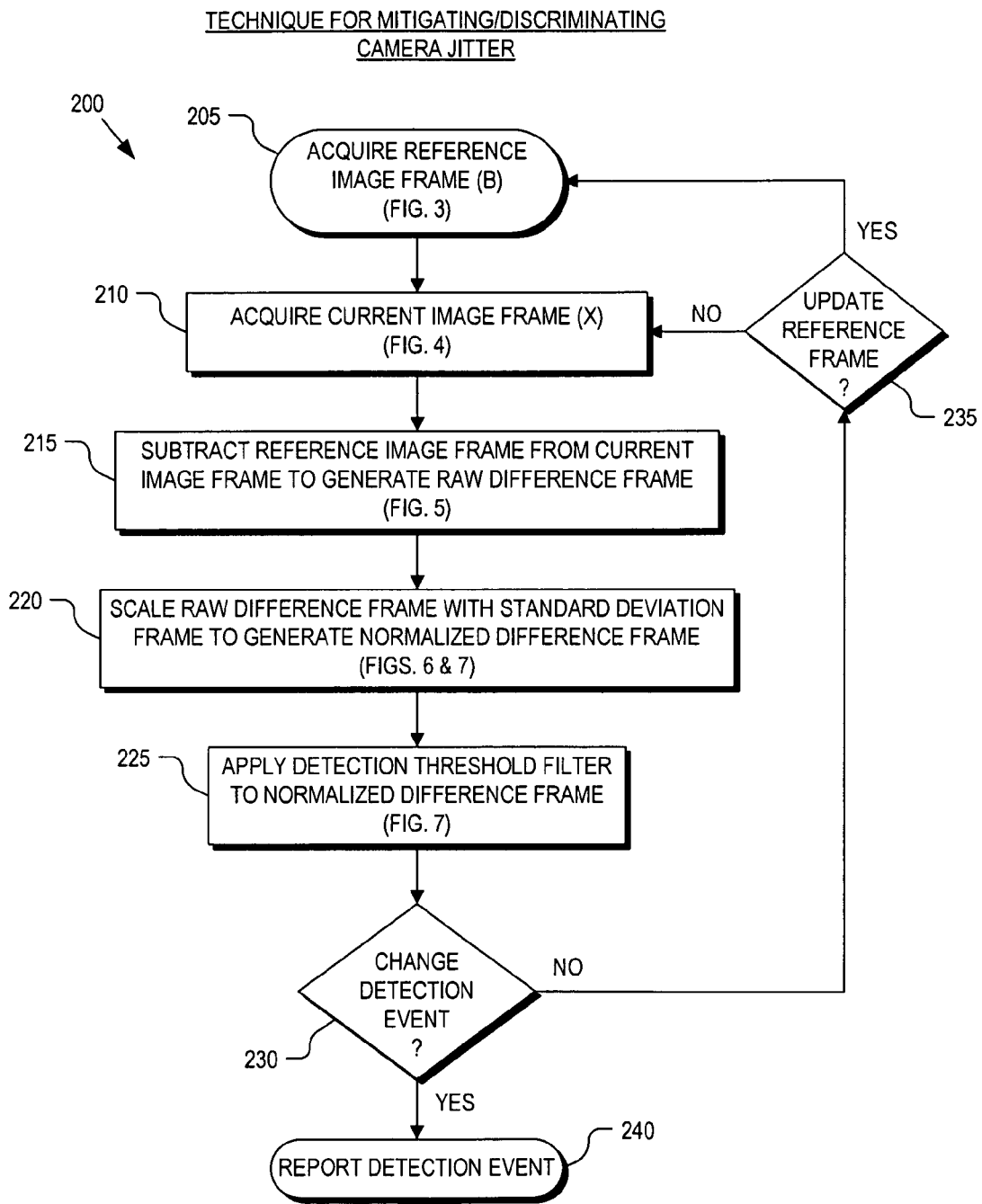
FIG. 2 is a flow chart illustrating a process for mitigating camera jitter in staring sensors and for the automatic detection of small changes of relevance in scenes of staring sensors, in accordance with an embodiment of the invention.

FIG. 2 is a flow chart illustrating a process 200 for mitigating camera jitter in staring sensors and for automatic detection of small changes of relevance in scenes of staring sensors, in accordance with an embodiment of the invention. The order in which some or all of the process blocks appear in process 200 should not be deemed limiting. Rather, one of ordinary skill in the art having the benefit of the present disclosure will understand that some of the process blocks may be executed in a variety of orders not illustrated.

In a process block 205, a staring sensor is used to capture or acquire a reference image frame. A staring sensor is a fixed camera that is focused on or perceives a generally static background scene. For example, a staring sensor may be any of a webcam, a traffic camera, a security camera, a surveillance camera, a radiometric camera, or otherwise. FIG. 3 illustrates an example reference image frame 300 acquired by a webcam staring at a fixed golf course scene. Reference image frame 300 may be a background image acquired based upon a single prior frame, based upon a history of prior frames, based upon a running infinite impulse response ("IIR") filter, based upon a subspace projection, or otherwise. For convenience, each pixel value in reference image frame 300 may be defined as a function of B(k,h;t), where 'k' represents a row in the frame, 'h' represents a column in the frame, and 't' represents the time at which reference image frame 300 was generated.

In a process block 210, the same staring sensor is used to capture a current image frame 400 (see FIG. 4). Current image frame 400 also captures the same background golf course scene as reference image frame 300 several seconds later, except with subtle, almost imperceptible differences. These differences can be due to "true" changes in the scene, such as a flag changing direction due to wind (see circle 405 in FIG. 4) or due to jitter of the camera platform itself—not "true" changes in the scene. Again, for convenience, each pixel in current image frame 400 may be defined as a function of X(k,h;t), where 'k' represents a row in the frame, 'h' represents a column in the frame, and 't' represents the time at which current image frame 400 was generated.

To determine differences between reference image frame 300 and current image frame 400, a raw difference frame 500 is generated (process block 215; see FIG. 5). In one embodiment, raw difference frame 500 is generated by subtracting the pixel intensity values in reference image frame 300 from the corresponding pixel intensity values in current image frame 400, according to the following relation:

$$DIFF(k,h;t) = X(k,h;t) - B(k,h;t), \quad (R1)$$

where DIFF(k,h;t) represents the resultant pixel intensity values of raw difference frame 500. While raw difference frame 500 does show the location of the flag, many clutter-induced changes are also apparent along the ridgeline and the edges of the water hazard, sand trap, and cart path. If a "change detection event" is declared by thresholding raw difference frame 500 at the level of the brightest pixel on the flag, spurious detection will be reported at over one hundred additional pixels lying along the ridgeline and the edges of the water hazard, which do not represent true changes in the scene. This is referred to as "clutter noise" or "jitter noise."

Figure 7:
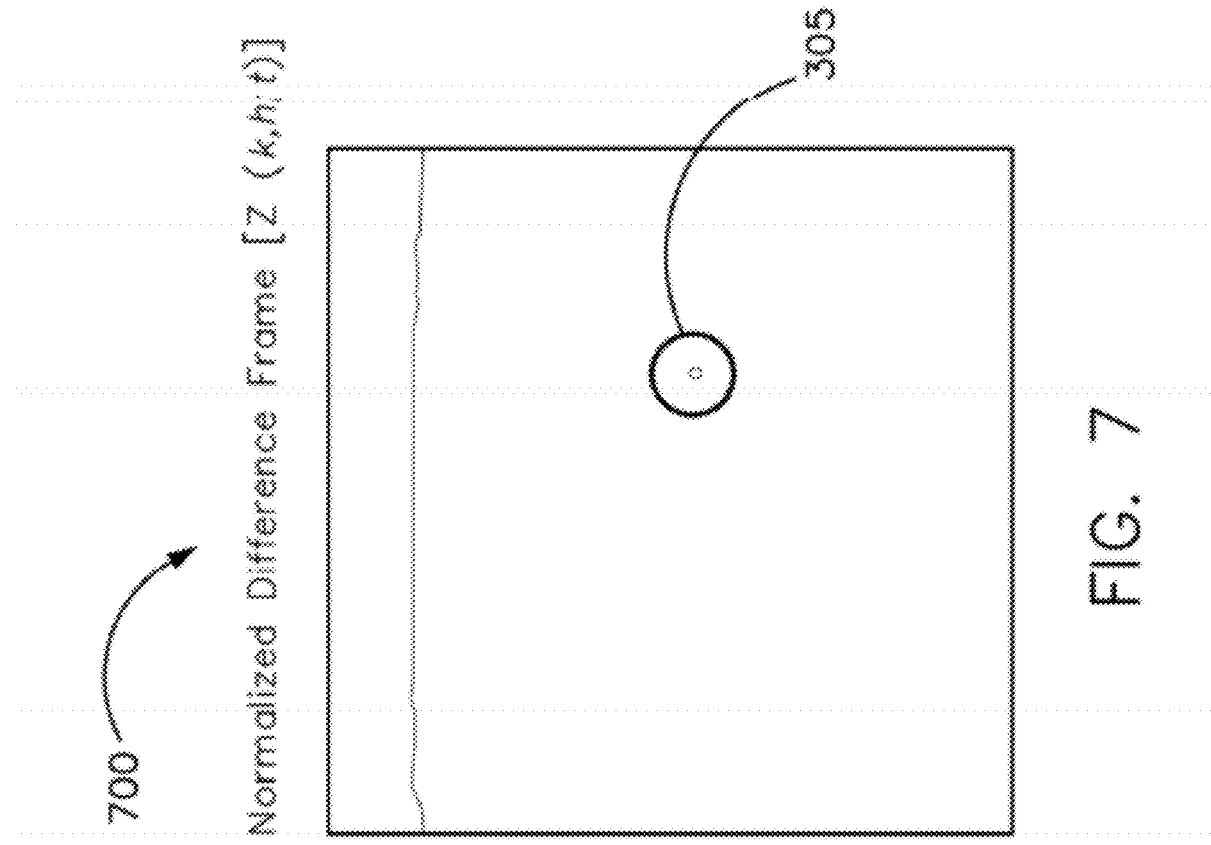
FIG. 7 is a normalized difference frame used for mitigating camera jitter and reducing false detection events in a scene of a staring sensor, in accordance with an embodiment of the invention.
Figure 6:
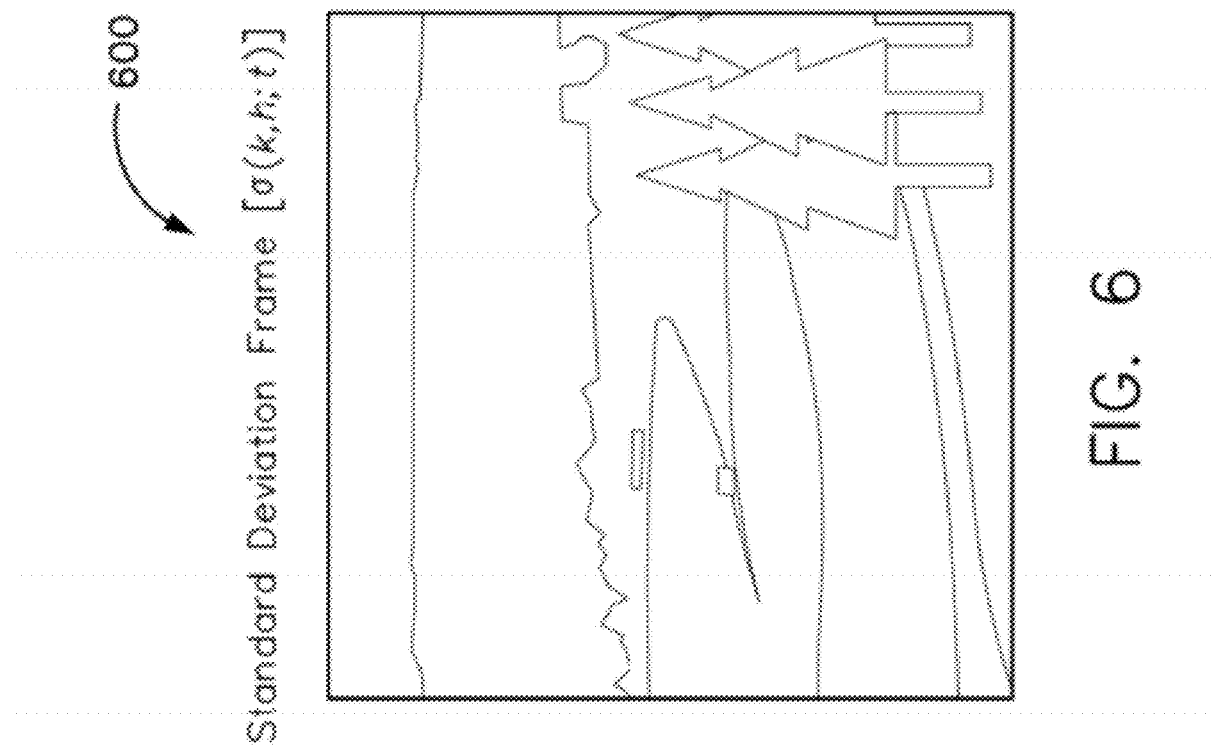
FIG. 6 is a spatial standard deviation frame used for scaling the raw difference frame, in accordance with an embodiment of the invention.

Accordingly, to mitigate the effects of camera jitter (e.g., clutter noise) on raw difference frame 500, each of the pixels within DIFF(k,h;t) are scaled (process block 220). In one embodiment, raw difference frame 500 is scaled with a standard deviation frame 600 (see FIG. 6) to generate a normalized difference frame 700 (see FIG. 7). Each pixel of standard deviation frame 600, mathematically represented as a(k,h;t), is a type of error estimate for the associated pixel in raw difference frame 500. Error estimates other than standard deviations may also be used to scale the pixel values of raw difference frame 500. In an alternative embodiment, instead of scaling the raw difference frame 500 with the pixel error estimates to generate normalized difference frame 700, the pixels of raw difference frame 500 may simply be compared to their error estimates to determine whether the pixel values of raw difference frame 500 fall outside their corresponding error estimates.

The error estimates of standard deviation frame 600 may be generated using a spatial error estimate technique or a hybrid spatial-temporal error estimate technique, as described below in connection with FIGS. 8A and 8B. The spatial error estimate is a scene-based approach that employs a nominal jitter distribution (which can be specified conservatively based on the expected camera application and jitter environment) and takes advantage of the linearity of the expectation operator to provide estimates of the mean and variance of each pixel based on a single frame. Pixels lying near regions of high scene gradient (intensity gradient) are more influenced by jitter and thus have larger standard deviations for a random sampling of raw difference frames 500 than pixels lying in relatively homogeneous regions (low intensity gradients). Referring to standard deviation frame 600, the high gradient portions of the scene (e.g., ridgeline, waterline, sand trap) are assigned a higher error estimate value, while the homogeneous regions are assigned smaller error estimates.

Frame differences are normalized by these spatially-derived moment estimates, allowing for proper accounting of scene intensity gradients in event detection and characterization, and decreasing the number and impact of jitter-induced artifacts in the processing stream. Because the spatial interpolation calculations are linear and their summations truncated, as discussed below, the spatial error estimates can be calculated at frame rates. This improvement is seen in normalized difference frame 700, where the flag clearly stands out from the remainder of the frame. Scaling of raw difference frame 500 with standard deviation frame 600 to generate normalized difference frame 700, represented mathematically as $Z_{SPATIAL}(k,h;t)$ for a pure spatial normalization or $Z_{HYBRID}(k,h;t)$ for a hybrid normalization, may be calculated as follows:

$$Z_{SPATIAL}(k,h;t) = \frac{X(k,h;t) - B(k,h;t)}{\sigma_{SPATIAL}(k,h;t)}, \quad (R2)$$

$$Z_{HYBRID}(k, h; t) = \frac{X(k, h; t) - B(k, h; t)}{\sigma_{MAX}(k, h; t)}, \quad (R3)$$

where $\sigma_{SPATIAL}(k,h;t)$ represents spatial error estimates and $\sigma_{mAx}(k,h;t)$ represent hybrid error estimates (described below in detail).

In a process block 225, a detection threshold filter is applied to normalized difference frame 700 to determine whether a change detection event is recognized in the scene. The detection threshold filter may apply a simple threshold algorithm, such as, if a threshold number of pixels within normalized difference frame 700 have pixel intensity values that exceed a threshold intensity value, then a "true" change detection event is determined to have occurred, otherwise any observed changes are deemed noise. If a detection event is determined (decision block 230), then the event is reported (process block 240). If a detection event is not detected (decision block 230), then process 200 loops again. Consecutive loops through process 200 may reuse the same reference image frame 300 and standard deviation frame 600. Periodically or sequentially, reference image frame 300 may be updated (decision block 235) and reacquired (process block 205). In one embodiment, the update of reference image frame 300 is an independent process of detecting changes in the scene of the staring sensor. Though not illustrated in process 200, standard deviation frame 600 may also be periodically or sequentially updated every 'n' loops through process 200, where n=1, 2, 3 . . . .

Figure 8A:
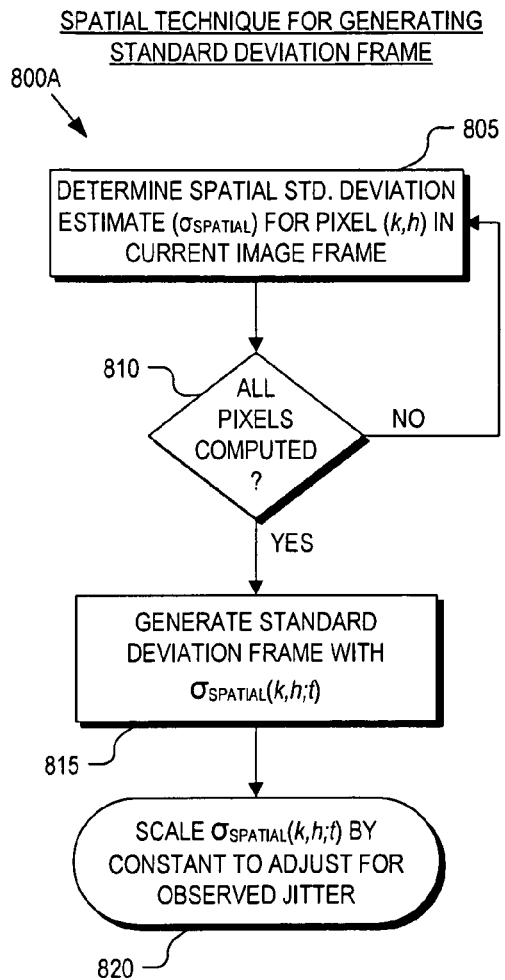
FIG. 8A is a flow chart illustrating a process for generating a spatial standard deviation frame, in accordance with an embodiment of the invention.

FIG. 8A is a flow chart illustrating a process 800A for generating a spatial standard deviation frame, in accordance with an embodiment of the invention. A spatial standard deviation frame $\sigma_{SPATIAL}$ is a type of standard deviation frame 600 computed using the spatial (as opposed to temporal) technique described below. Again, the order in which some or all of the process blocks appear in process 800A should not be deemed limiting. Rather, one of ordinary skill in the art having the benefit of the present disclosure will understand that some of the process blocks may be executed in a variety of orders not illustrated.

In a process block 805, a spatial standard deviation estimate $\sigma_{SPATIAL}(k,h;t)$ for pixel (k,h) within current image frame 400 is calculated. The spatial standard deviation estimate is calculated for all pixels within current image frame 400 (decision block 810) until a complete spatial standard deviation frame $\sigma_{SPATIAL}$ is calculated (process block 815). Subsequently, all values of $\sigma_{SPATIAL}(k,h;t)$ may be scaled by a constant to adjust for the severity of observed jitter. Under-scaling may result in too many false detections, while over-scaling may result in under-reporting true relevant detections. The calculation and derivation of $\sigma_{SPATIAL}(k,h;t)$ is now described.

The spatial variance estimate relies upon a spatial technique, as opposed to temporal histories, to estimate the variability of each pixel's intensity in the presence of jitter. Spatial variance estimates are based on the realization that one does not need to observe line of sight ("LOS") jitter over multiple frames to know which pixels may exhibit large intensity changes in the presence of such jitter. Pixels located in regions of high scene intensity gradients are more susceptible than those lying in relatively homogeneous intensity regions, and the variability of each pixel's intensity in the presence of jitter can be estimated from a single frame. This is accomplished using a grid of conditional expectations in the vicinity of each pixel.

Figure 9:
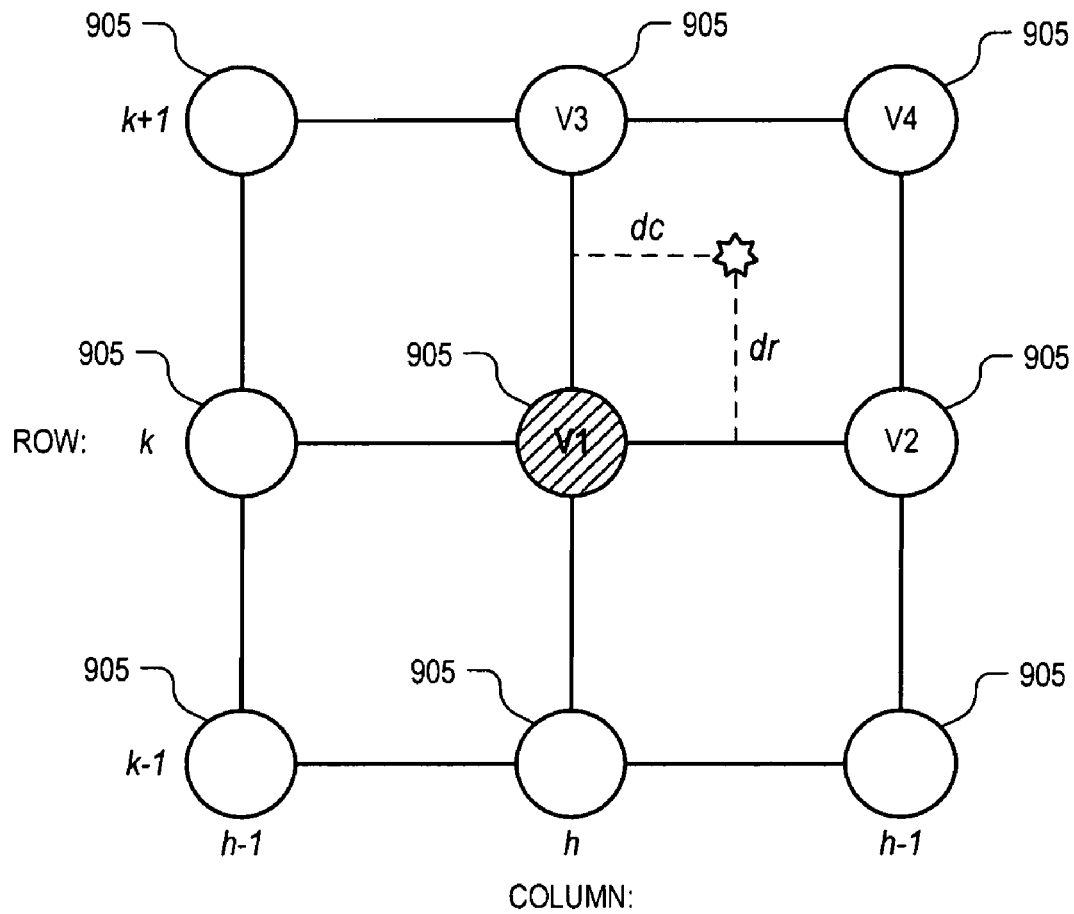
FIG. 9 is a diagram illustrating a grid of pixel values, in accordance with an embodiment of the invention.

Consider the example shown in FIG. 9. Nodes 905 represent pixel centers in an arbitrary 3×3 sub-region of a larger image frame. At time t−1, the value at pixel (row,col)=(k, h) is equal to $V_1$, with values at nearby pixels given by $V_2$, $V_3$, and $V_4$. Suppose that it is known that the jitter occurring between time t−1 and time t will shift the sensor so that pixel (k, h) will be centered at the position corresponding to (k+dr, h+dc) at time t. In this case, bilinear interpolation could be used to predict the value observed at pixel (k, h) at time t in the following manner:

$$B(k,h,t)=V_1+dr(V_3-V_1)+dc(V_2-V_1)+(dr)(dc)(V_1+V_4-V_2-V_3). \quad \text{(Eq. 1)}$$

If the true shift (dr, dc) is unknown (as will generally be the case), its statistical distribution can be used to estimate the mean and variance of each pixel at time t as a function of the pixel values at t−1. This is accomplished using a grid of conditional expectations in the neighborhood of each pixel location. We begin by assuming that the statistical distribution of the jitter is known. For example, suppose that the row and column shifts occurring between times t−1 and t are independent and identically distributed as Gaussian with mean zero and standard deviation σ. From this distribution, we can compute the probability of the sensor jittering in such a manner that pixel (k, h) will be centered in any of the "cells" in the vicinity of (k, h) at time t.

Let $C_{ij}(t)$ represent the event that the jitter occurring between time t−1 and time t has a row displacement between i−1 and i and a column displacement between j−1 and j. The probability of event $C_{ij}(t)$ is denoted P(i, j). Note that the probability does not depend on the time t, as the jitter distribution is assumed to be stationary. Nor does P(i, j) depend on the location (k, h) of the particular pixel whose value we are predicting, as jitter is assumed to manifest itself as a rigid translation over the entire image.

Figure 10:
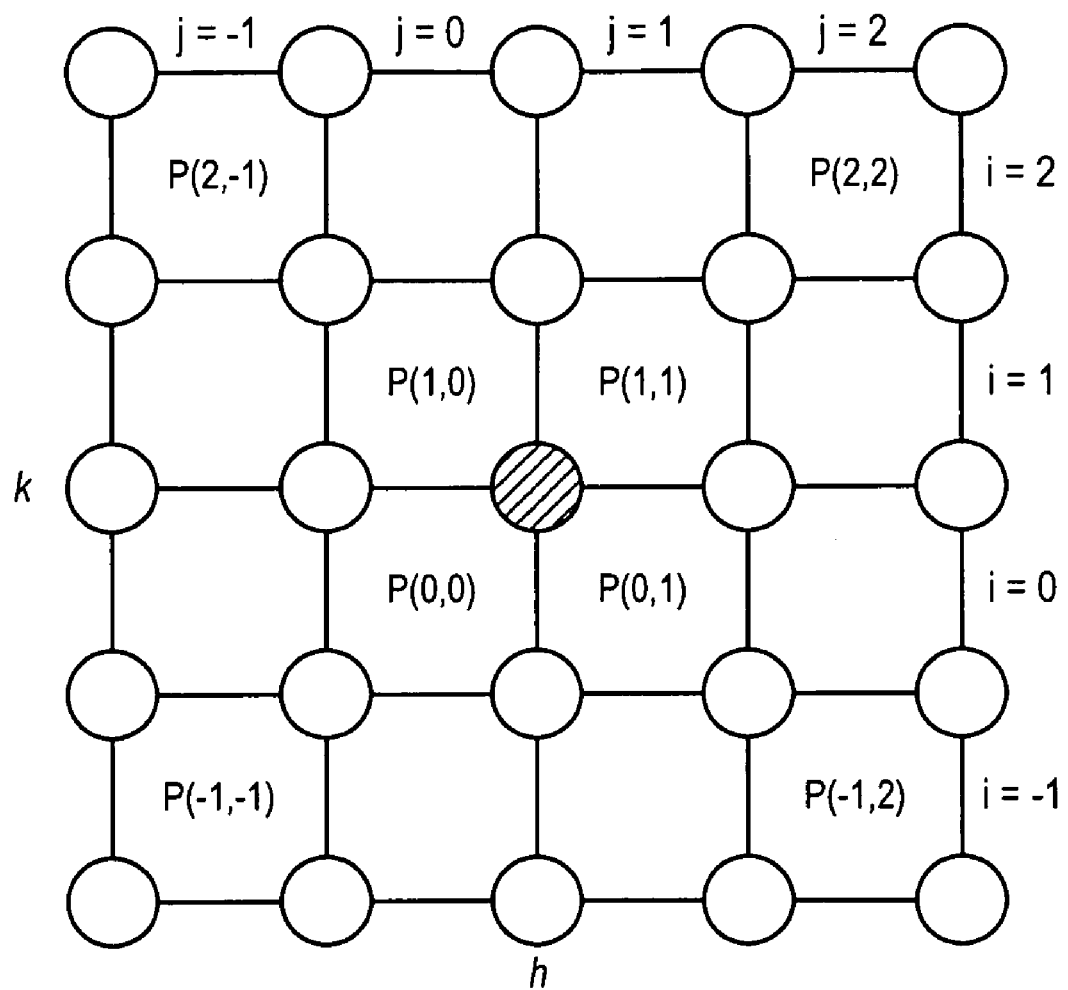
FIG. 10 is a diagram illustrating a grid of cell probabilities in the vicinity of a pixel (k,h), in accordance with an embodiment of the invention.

Thus, for any arbitrary pixel (k, h), the quantity P(i, j) represents the probability that jitter will re-center pixel (k, h) to a row position between k+i−1 and k+i, and a column position between h+j−1 and h+j. The grid of probabilities in the vicinity of pixel (k, h) is depicted in FIG. 10.

The actual probabilities P(i, j) can be estimated in a straightforward manner from the assumed bivariate Gaussian distribution of the row and column displacements. In particular:

$$P(i, j) = \left[\Phi\left(\frac{i+1}{\sigma}\right) - \Phi\left(\frac{i}{\sigma}\right)\right]\left[\Phi\left(\frac{j+1}{\sigma}\right) - \Phi\left(\frac{j}{\sigma}\right)\right] \quad \text{(Eq. 2)}$$

where Φ represents the probability distribution function of a standard (zero mean, unit variance) Gaussian random variable. Commercial software enabling numerical evaluation of the function Φ and its inverse is readily available. Probabilities computed using (Eq. 2) will be concentrated in a small block of cells centered on the node (k, h). For any value of σ that is specified, a box size can be calculated such that the probability of jittering to a location within a BOX×BOX region centered on (k, h) will exceed 99%. To find the appropriate box size, the quantity Y is computed as follows:

$$Y = -\sigma\Phi^{-1}\left(\frac{1-\sqrt{0.99}}{2}\right) = 2.806\sigma \quad \text{(Eq. 3)}$$

Here, $\Phi^{-1}$ is the inverse standard Gaussian distribution function. Numerical evaluation gives 2.806 as the Gaussian quantile corresponding to probability $(1-\sqrt{0.99})/2$. It follows that the minimum box size required to ensure a 99% coverage probability has dimension equal to twice the smallest integer that exceeds $2.806\sigma$. Thus, if $\sigma=\frac{1}{4}$ pixel, we see that $Y=0.702$, and a 2×2 cell region centered on (k, h) has at least a 99% chance of containing the position jittered to at time t. For $\sigma=\frac{1}{2}$ pixel, a 4×4 cell region like the one depicted in FIG. 10 has at least a 99% coverage probability, while a 6×6 cell region will suffice for $\sigma=1$. Cells lying outside of the centered region calculated for a given value of $\sigma$ have very low probability and thus minimal impact on the spatial variance estimates. Omitting such outlying cells from the calculations that follow provides a substantial improvement in computational runtime.

Once an appropriate box size has been identified, (Eq. 2) is used to compute the probability of each cell within the box. These probabilities are normalized by the total probability of the centered BOX×BOX region. The normalizing factor, $P_{TOT}$, is calculated by inverting (Eq. 3):

$$P_{TOT} = \left[1 - 2\Phi\left(\frac{BOX}{2\sigma}\right)\right]^2 \quad \text{(Eq. 4)}$$

The normalized probability estimate for the cell bounded by rows k+i−1 and k+i, and columns h+j−1 and h+j is denoted $\tilde{P}(i, j)$, and is given by:

$$\tilde{P}(i,j)=P(i,j)/P_{TOT} \quad \text{(Eq. 5)}$$

Normalization ensures that the sum of the cell probabilities used in spatial variance estimation is equal to unity. Because $P_{TOT}$ is defined to lie between 0.99 and 1.0, the adjustments made in (Eq. 5) are minor.

The next step in spatial variance estimation is calculating the conditional expected value of pixel (k, h) at time t, given that it has jittered into a specific cell. This quantity depends on the exact row and column displacements (dr and dc) within the cell to which the pixel has jittered, and the values of the four pixels bordering the cell at time t−1. Of these six quantities, only dr and dc are unknown at time t−1. Because the pixel value estimate (Eq. 1) is linear in the unknowns, its mean and mean-square can be computed in a straightforward manner. Begin by defining the following quantities for algebraic convenience:

$$D_1 = V_1$$

$$D_2 = V_3 - V_1$$

$$D_3 = V_2 - V_1$$

$$D_4 = V_1 + V_4 - V_2 - V_3$$

As in FIG. 9, $V_1$ here represents the pixel value (at time t−1) in the lower left-hand corner of the cell into which jitter has occurred, while $V_2$, $V_3$, and $V_4$ are the lower-right, upper left, and upper right corners, respectively. All of these quantities are known at time t−1.

From (Eq. 1), it follows that the conditional expected values are given by:

$$E[B(k,h,t)|C_{ij}(t)] = D_1 + D_2 E[dr|C_{ij}(t)] + D_3 E[dc|C_{ij}(t)] + D_4 E[dr|C_{ij}(t)]E[dc|C_{ij}(t)] \quad \text{(Eq. 6a)}$$

$$E[B^2(k,h,t)|C_{ij}(t)] = D_1^2 + 2D_1 D_2 E[dr|C_{ij}(t)] + 2D_1 D_3 E[dc|C_{ij}(t)] + 2(D_1 D_4 + D_2 D_3) E[dr|C_{ij}(t)]E[dc|C_{ij}(t)] + D_2^2 E[dr^2|C_{ij}(t)] + D_3^2 E[dc^2|C_{ij}(t)] + 2D_2 D_4 E[dr^2|C_{ij}(t)]E[dc|C_{ij}(t)] + 2D_3 D_4 E[dr|C_{ij}(t)]E[dc^2|C_{ij}(t)] + D_4^2 E[dr^2|C_{ij}(t)]E[dc^2|C_{ij}(t)]. \quad \text{(Eq. 6b)}$$

We see in (Eq. 6a) and (Eq. 6b) that the mean and variance of the pixel value estimates obtained using bilinear interpolation are functions of the conditional expected values of the row and column displacements and their squares, given jitter into a specific cell. These conditional expectations are calculated using the truncated normal distribution [Johnson, N. L. et al., Continuous Univariate Distributions, Vol. 1, Second Edition, New York: John Wiley & Sons, (1994)]. In particular:

$$E[dr | C_{ij}(t)] = \left[\frac{\varphi\left(\frac{i}{\sigma}\right) - \varphi\left(\frac{i+1}{\sigma}\right)}{\Phi\left(\frac{i+1}{\sigma}\right) - \Phi\left(\frac{i}{\sigma}\right)}\right]\sigma - i, \quad \text{(Eq. 7a)}$$

and:

$$E[dr^2 | C_{ij}(t)] = \sigma^2 + i^2 - \frac{i\sigma\varphi\left(\frac{i}{\sigma}\right) - (i-1)\sigma\varphi\left(\frac{i+1}{\sigma}\right)}{\Phi\left(\frac{i+1}{\sigma}\right) - \Phi\left(\frac{i}{\sigma}\right)}. \quad \text{(Eq. 7b)}$$

Note that $\varphi$ represents the density function of the standard normal distribution. Conditional expectations for the column displacements, $E[dc|C_{ij}(t)]$ and $E[dc^2|C_{ij}(t)]$, are calculated for each column j in the same manner as above.

Substituting the quantities (7a) and (7b), and their equivalents for column displacement, into equations (6a) and (6b) give expressions for the expected value and variance in pixel (k, h) at time t, given jitter into the cell bounded by rows k+i−1 and k+i, and columns h+j−1 and h+j. The Law of Total Probability is then invoked to estimate the unconditional expectations:

$$E[B(k, h, t)] = \sum_i \sum_j E[B(k, h, t) | C_{ij}(t)] \cdot \tilde{P}(i, j) \quad \text{(Eq. 8a)}$$

$$E[B^2(k, h, t)] = \sum_i \sum_j E[B^2(k, h, t) | C_{ij}(t)] \cdot \tilde{P}(i, j). \quad \text{(Eq. 8b)}$$

The double sums in (8a) and (8b) each run from a lower limit of (1−BOX/2) to an upper limit of BOX/2.

Finally, the spatial estimate of the variance of pixel (k, h) at time t is calculated from first principles:

$$\text{var}[B(k,h,t)] = E[B^2(k,h,t)] - E^2[B(k,h,t)], \text{ and} \quad \text{(Eq. 9)}$$

$$\sigma_{SPATIAL}(k,h;t) = \sqrt{\text{var}[B(k,h,t)]}. \quad \text{(Eq. 10)}$$

With this approach, spatial variance estimates for every pixel (k,h) and time t can be computed based only on the pixel values in frame t−1 and the assumed jitter model. Such estimates may be used to normalize raw difference frames, highlighting transient temporal changes in the imaged scene, while reducing false detections from scene clutter. In addition, the spatial characteristics of the estimated variance maps may be used in the design of matched filters to separate legitimate change along scene gradients from purely jitter-induced artifacts.

The spatial technique of pixel variance estimation disclosed herein is robust to mis-specification of the jitter distribution. Because of this property, spatial variance estimates may out-perform conventional temporal estimates in the presence of non-stationary jitter.

Figure 8B:
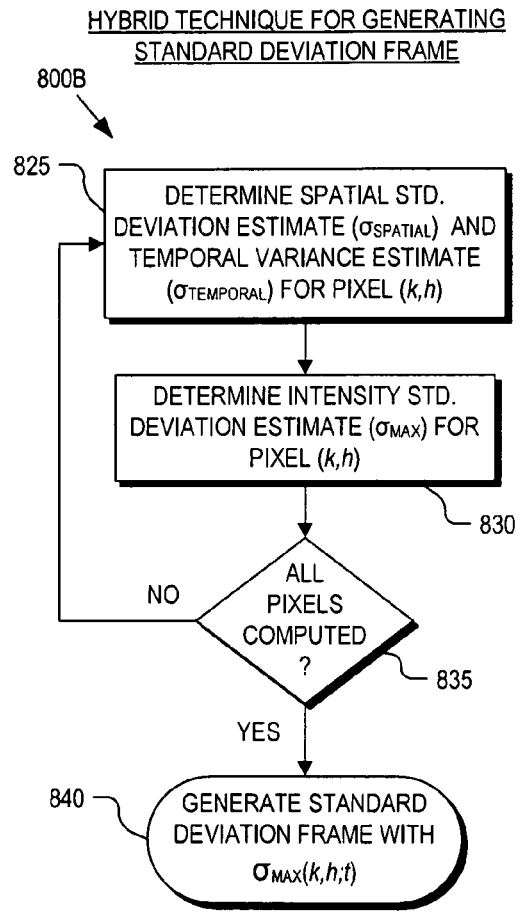
FIG. 8B is a flow chart illustrating a process for generating a hybrid spatial and temporal standard deviation frame, in accordance with an embodiment of the invention.

FIG. 8B is a flow chart illustrating a process 800B for generating a hybrid (spatial and temporal) standard deviation frame, in accordance with an embodiment of the invention. A hybrid standard deviation frame is a type of standard deviation frame 600 computed using both the spatial standard deviation estimates $\sigma_{SPATIAL}(k,h;t)$ (described above) and conventional standard deviation estimates $\sigma_{TEMPORAL}(k,h;t)$. Conventional standard deviation estimates use a temporal approach in which the standard deviation of each pixel's intensity is estimated using a time history of each pixel's observed residuals about the background. A "pure temporal" approach to pixel variance estimation can lead to high false alarm rates along spatial gradients in the presence of nonstationary jitter, particularly in the presence of a sudden increase in jitter magnitude. In contrast, a "pure spatial" approach to pixel variance estimation may cause noise-induced false alarms in more uniform parts of a scene. Accordingly, the disclosed hybrid spatial-temporal approach combines the strengths of the two pure approaches. This can lead to a substantial reduction in false alarms, without sacrificing detection of legitimate motion events.

Again, the order in which some or all of the process blocks appear in process 800B should not be deemed limiting. Rather, one of ordinary skill in the art having the benefit of the present disclosure will understand that some of the process blocks may be executed in a variety of orders not illustrated. In a process block 805, a spatial standard deviation estimate $\sigma_{SPATIAL}$ and a temporal standard deviation estimate $\sigma_{TEMPORAL}$ for pixel (k,h) within raw difference frame 500 is calculated. The temporal standard deviation estimate $\sigma_{TEMPORAL}$ may be calculated as a standard deviation estimate based upon a history of prior frames.

Once $\sigma_{SPATIAL}$ and $\sigma_{TEMPORAL}$ are calculated for a given pixel (k, h), the maximum value between the two is selected (process block 830):

$$\sigma_{MAX}(k,h;t)=\max\{\sigma_{SPATIAL}(k,h;t),\sigma_{TEMPORAL}(k,h;t)\}. \quad \text{(Eq. 11)}$$

The spatial standard deviation estimates and the temporal standard deviation estimates are calculated and the maximum value selected for all pixels (decision block 835) until a complete hybrid standard deviation frame $\sigma_{MAX}(k,h;t)$ is generated. In one embodiment, although not illustrated in FIG. 8B, the spatial standard deviation estimates $\sigma_{SPATIAL}$ may be scaled to adjust for the severity of observed jitter prior to process block 830.

Figure 11:
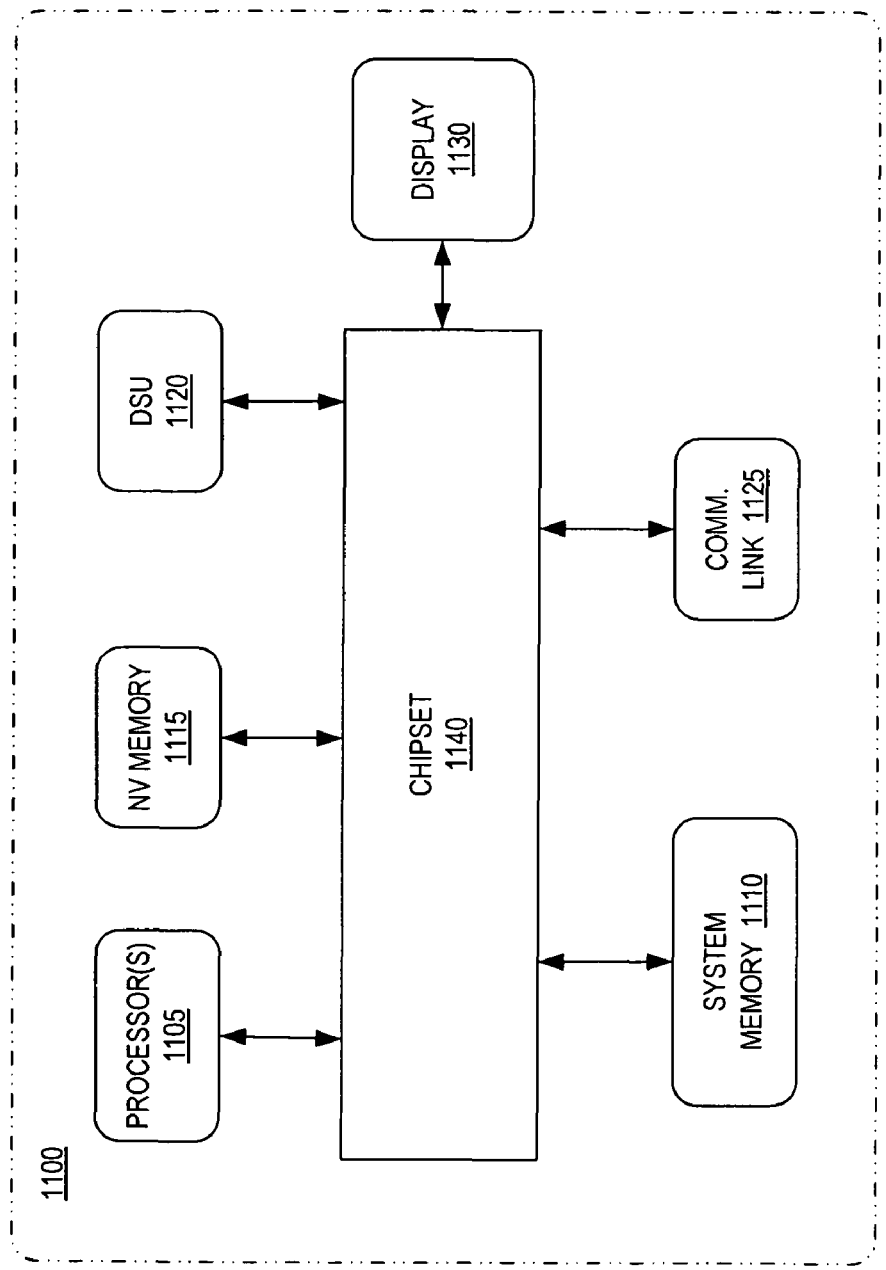
FIG. 11 is a block diagram illustrating a demonstrative processing system to store and execute embodiments of the invention thereon.

FIG. 11 is a block diagram illustrating a demonstrative processing system 1100 for executing embodiments of the invention described above. The illustrated embodiment of processing system 1100 includes one or more processors (or central processing units) 1105, system memory 1110, non-volatile ("NV") memory 1115, a data storage unit ("DSU") 1120, a communication link 1125, a display 1130, and a chipset 1140. The illustrated processing system 1100 may represent any computing system including a desktop computer, a notebook computer, a workstation, a handheld computer, a server, a blade, or the like.

The elements of processing system 1100 are interconnected as follows. Processor(s) 1105 is communicatively coupled to system memory 1110, NV memory 1115, DSU 1120, and communication link 1125, via chipset 1140 to send and to receive instructions or data thereto/therefrom. In one embodiment, NV memory 1115 is a flash memory device. In other embodiments, NV memory 1115 includes any one of read only memory ("ROM"), programmable ROM, erasable programmable ROM, electrically erasable programmable ROM, or the like. In one embodiment, system memory 1110 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1120 represents any storage device for software data, applications, and/or operating systems, but will most typically be a nonvolatile storage device. DSU 1120 may optionally include one or more of an integrated drive electronic ("IDE") hard disk, an enhanced IDE ("EIDE") hard disk, a redundant array of independent disks ("RAID"), a small computer system interface ("SCSI") hard disk, floppy disks, magnetic tapes, various other types of hard disks, and the like. Although DSU 1120 is illustrated as internal to processing system 1100, DSU 1120 may be externally coupled to processing system 1100. Communication link 1125 may couple processing system 1100 to a network such that processing system 1100 may communicate over the network with one or more other computers. Communication link 1125 may include a modem, an Ethernet card, a Gigabit Ethernet card, Universal Serial Bus ("USB") port, a wireless network interface card, a fiber optic interface, or the like. Display unit 1130 may be coupled to chipset 1140 via a graphics card and renders images for viewing by a user.

It should be appreciated that various other elements of processing system 1100 may have been excluded from FIG. 11 and this discussion for the purposes of clarity. Chipset 1140 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1140. Correspondingly, processing system 1100 may operate without one or more of the elements illustrated. For example, processing system 1100 need not include DSU 1120.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, magnetic tapes, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method, comprising:
   acquiring a reference image frame and a current image frame of a scene with a camera;

generating a raw difference frame based upon differences between the reference image frame and the current image frame;

generating pixel error estimates for each pixel in the raw difference frame based at least in part upon spatial error estimates related to spatial intensity gradients in the scene; and using the pixel error estimates to mitigate effects of camera jitter between the reference image frame and the current image frame, wherein using the pixel error estimates to mitigate the effects of the camera jitter comprises scaling pixel intensity values in the raw difference frame with the pixel error estimates.

2. The computer implemented method of claim 1, wherein scaling the pixel intensity values in the raw difference frame with the pixel error estimates comprises:

dividing each of the pixel intensity values within the raw difference frame by its corresponding pixel error estimate to generate normalized pixel values; and generating a normalized difference frame including the normalized pixel values.

3. The computer implemented method of claim 2, further comprising detecting changes in the scene between the current image frame and the reference image frame based upon the normalized difference frame.

4. The computer implemented method of claim 1, wherein the pixel error estimates are computed by interpolating pixel intensities between adjacent pixels in a single image frame and assuming a jitter distribution, which is manifested as rigid translations over an entire image frame.

5. The computer implemented method of claim 1, wherein the pixel error estimates comprise hybrid error estimates computed based upon a combination of the spatial error estimates that are related to intensity gradients in the scene and temporal error estimates based upon a history of past image frames of the scene.

6. The computer implemented method of claim 5, wherein the combination of the spatial error estimates and the temporal error estimates comprises using a larger value between the spatial error estimates and the temporal error estimates for each pixel.

7. A computer-accessible non-transitory storage medium that provides instructions that, if executed by a machine, will cause the machine to perform operations comprising:

acquiring a reference image frame of a scene with a staring sensor;

acquiring a current image frame of the scene with the staring sensor;

generating a raw difference frame based upon differences between the reference image frame and the current image frame;

generating pixel error estimates for each pixel in the raw difference frame based at least in part upon spatial error estimates related to spatial intensity gradients in the scene, wherein the pixel error estimates are computed by interpolating pixel intensities between adjacent pixels; and using the pixel error estimates to mitigate effects of camera jitter of the staring sensor between the reference image frame and the current image frame, wherein using the pixel error estimates to mitigate the effects of the camera jitter comprises scaling pixel intensity values in the raw difference frame with the pixel error estimates.

8. The computer-accessible storage medium of claim 7, wherein scaling the pixel intensity values in the raw difference frame with the pixel error estimates comprises:

dividing each of the pixel intensity values within the raw difference frame by its corresponding pixel error estimate to generate normalized pixel values; and generating a normalized difference frame including the normalized pixel values.

9. The computer-accessible storage medium of claim 7, wherein using the pixel error estimates to mitigate the effects of the camera jitter comprises:

comparing pixel intensity values in the raw difference frame to the pixel error estimates to determine if the pixel intensity values fall outside their corresponding pixel error estimates.

10. The computer-accessible storage medium of claim 7, wherein the pixel error estimates are computed by interpolating pixel intensities between adjacent pixels of a single image frame and assuming a known jitter distribution, which is manifested as rigid translations over an entire image frame.

11. The computer-accessible storage medium of claim 7, wherein the pixel error estimates comprise hybrid error estimates computed based upon a combination of the spatial error estimates that are related to intensity gradients in the scene and temporal error estimates based upon a history of past image frames of the scene.

12. The computer-accessible storage medium of claim 11, wherein the combination of the spatial error estimates and the temporal error estimates comprises using a larger value between the spatial error estimates and the temporal error estimates for each pixel.

13. A computer implemented method for detecting changes in a scene perceived by a staring sensor, the computer implemented method comprising:

acquiring a reference image frame of the scene;

acquiring a current image frame of the scene;

generating a raw difference frame based upon the reference image frame and the current image frame; and scaling pixel values within the raw difference frame with pixel error estimates for the pixel values to generate scaled pixel values, wherein the pixel error estimates are computed based at least in part upon spatial error estimates determined from a single image frame and which are related to spatial intensity gradients in the scene.

14. The computer implemented method 13, further comprising thresholding the scaled pixel values;

determining if a change detection event has been perceived in the scene based upon the thresholding; and reporting the change detection event if the change detection event is determined to have occurred.

15. The computer implemented method of claim 13, wherein scaling the pixel values within the raw difference frame with the pixel error estimates for the pixel values comprises:

dividing each of the pixel values within the raw difference frame by its corresponding pixel error estimate to generate normalized pixel values; and generating a normalized difference frame including the normalized pixel values.

16. The computer implemented method of claim 15, further comprising scaling all of the normalized pixel values by a single constant to adjust for camera jitter of the staring sensor.

17. The computer implemented method of claim 13, wherein the pixel error estimates comprises standard deviation estimates for the pixel values within the raw difference frame and wherein the spatial error estimates comprise spatial standard deviation estimates.

18. The computer implemented method of claim 17, wherein the spatial standard deviation estimates are computed by interpolating pixel intensities between adjacent pixels and assuming that camera jitter displacements are Gaussian and manifested as rigid translations over an entire image frame.

19. The computer implemented method of claim 13, wherein the pixel error estimates comprise hybrid error estimates computed based upon a combination of the spatial error estimates that are related to intensity gradients in the scene and temporal error estimates based upon a history of past image frames of the scene.

20. The computer implemented method of claim 19, wherein the combination of the spatial error estimates and the temporal error estimates comprises using a larger value between the spatial error estimates and the temporal error estimates for each pixel.

21. The computer implemented method of claim 13, wherein the staring sensor is selected from the group consisting of a webcam, a traffic camera, a surveillance camera, a security camera, staring space-based sensor, and a radiometric sensor.

22. The computer implemented method of claim 13, wherein the pixel error estimates are computed at full frame rates of the staring sensor.

* * * * *